United States Patent
Stewart et al.

(10) Patent No.: US 11,087,451 B2
(45) Date of Patent: Aug. 10, 2021

(54) GENERATING MULTI-FOCAL DEFECT MAPS USING OPTICAL TOOLS

(71) Applicant: TEXAS INSTRUMENTS INCORPORATED, Dallas, TX (US)

(72) Inventors: Elizabeth C. Stewart, Dallas, TX (US); Young Sawk Oh, Dallas, TX (US); Zhiyi Yu, Allen, TX (US); Jeffrey A. West, Dallas, TX (US); Thomas D. Bonifield, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 487 days.

(21) Appl. No.: 15/847,600

(22) Filed: Dec. 19, 2017

(65) Prior Publication Data
US 2019/0188839 A1 Jun. 20, 2019

(51) Int. Cl.
*G06K 9/00* (2006.01)
*G06T 7/00* (2017.01)

(52) U.S. Cl.
CPC .... *G06T 7/001* (2013.01); *G06T 2207/20076* (2013.01); *G06T 2207/20081* (2013.01); *G06T 2207/30148* (2013.01)

(58) Field of Classification Search
CPC .......... H01L 21/8258; H01L 27/14683; G01N 21/9501; G01N 21/9503; G01N 21/956; G06F 2203/04103; G06T 2207/30148
See application file for complete search history.

(56) References Cited

U.S. PATENT DOCUMENTS

| | | | | |
|---|---|---|---|---|
| 5,424,552 A * | 6/1995 | Tsuji | ................... | G03F 7/70241 |
| | | | | 250/548 |
| 6,173,750 B1 * | 1/2001 | Davis | ................ | H01L 21/67144 |
| | | | | 156/707 |
| 6,972,201 B1 * | 12/2005 | Subramanian | .......... | G03F 7/091 |
| | | | | 257/E21.029 |
| 7,659,975 B1 * | 2/2010 | Ramani | .............. | G01N 21/9505 |
| | | | | 356/237.4 |

(Continued)

OTHER PUBLICATIONS

Radigan et al., Using Full Wafer Defect Maps as Process Signatures to Monitor and Control Yield, 1991, 1991 IEEE/SEMI Int'l Semiconductor Manufacturing Science Symposium , pp. 129-135.*

(Continued)

*Primary Examiner* — Guillermo M Rivera-Martinez
(74) *Attorney, Agent, or Firm* — Andrew R. Ralston; Charles A. Brill; Frank D. Cimino

(57) ABSTRACT

A method comprises obtaining a wafer comprising a plurality of components, wherein each of the plurality of components exposes a first surface of the component present in a first focal plane and a second surface of the component present in a second focal plane. The method comprises generating, by an optical tool, a first image of the first surface and a second image of the second surface of one of the plurality of components. The method comprises comparing, by a processor, the first image with a first reference image to produce a first value and the second image with a second reference image to produce a second value. The method comprises generating, by the processor, a wafer map indicating a quality state of the one of the plurality of components based on the first and second values.

23 Claims, 4 Drawing Sheets

(56) References Cited

U.S. PATENT DOCUMENTS

| | | | | |
|---|---|---|---|---|
| 2002/0088952 | A1* | 7/2002 | Rao | G01N 21/9501 250/559.45 |
| 2002/0171944 | A1* | 11/2002 | Suenaga | G03F 7/70058 359/689 |
| 2005/0219518 | A1* | 10/2005 | Korngut | G01N 21/47 356/237.2 |
| 2006/0098189 | A1* | 5/2006 | Oomori | G01N 21/21 356/237.5 |
| 2006/0244956 | A1* | 11/2006 | Furman | G01N 21/8806 356/237.4 |
| 2007/0091317 | A1* | 4/2007 | Freischlad | G01B 11/0675 356/511 |
| 2009/0016595 | A1* | 1/2009 | Peterson | G03F 1/84 382/144 |
| 2011/0075151 | A1* | 3/2011 | Jeong | G01N 21/956 356/453 |
| 2012/0134542 | A1* | 5/2012 | Pang | G06T 7/001 382/106 |
| 2013/0308140 | A1* | 11/2013 | Goodwin | G01B 11/14 356/615 |
| 2014/0347644 | A1* | 11/2014 | Wu | G03F 7/70141 355/55 |
| 2015/0234269 | A1* | 8/2015 | Azpiroz | G03F 1/76 430/5 |
| 2015/0357398 | A1* | 12/2015 | Crook | H01L 28/40 257/532 |
| 2018/0149603 | A1* | 5/2018 | Bhattacharyya | G01N 21/9505 |

OTHER PUBLICATIONS

Guidotti et al., Non-Intrusive Mapping of Subsurface Defects in Semiconductors, 1992, Appl. Phys. A55, pp. 139-143.*

* cited by examiner

GENERATING MULTI-FOCAL DEFECT MAPS USING OPTICAL TOOLS

BACKGROUND

Microelectronic devices fabricated on semiconductor wafers can contain defects. In some cases, these defects occur during the fabrication process. For instance, equipment flaws or dust particles present in a fabrication facility may result in defects on a microelectronic device. Optical and electrical tests are typically employed to detect these defects.

SUMMARY

According to an example, a method comprises obtaining a wafer comprising a plurality of components, wherein each of the plurality of components exposes a first surface of the component present in a first focal plane and a second surface of the component present in a second focal plane. The method also comprises generating, by an optical tool, a first image of the first surface of one of the plurality of components. Further, the method comprises, generating, by the optical tool, a second image of the second surface of the one of the plurality of components. The method then comprises comparing, by a processor, the first image with a first reference image to produce a first value and the second image with a second reference image to produce a second value. The method further comprises generating, by the processor, a wafer map indicating a quality state of the one of the plurality of components based on the first and second values.

In another example, a method comprises obtaining a wafer comprising first and second components positioned consecutively on the wafer, the first component exposing multiple surfaces of the first component in separate focal planes, and the second component exposing other multiple surfaces of the second component in separate focal planes. The method then comprises obtaining, by an imaging tool, a first image depicting a first of the multiple surfaces of the first component and a first of the multiple surfaces of the second component, the first surface of the first component and the first surface of the second component in a common focal plane. The method further comprises obtaining, by the imaging tool, a second image depicting a second of the multiple surfaces of the first component and a second of the multiple surfaces of the second component, the second surface of the first component and the second surface of the second component in another common focal plane. The method then comprises comparing, by a processor, the first surfaces in the first image to generate a first value. The method also comprises comparing, by the processor, the second surfaces in the second image to generate a second value. The method further comprises generating, by the processor, a wafer map indicating a quality state of the first component, wherein the quality state depends on the first value and the second value.

In yet another example, a non-transitory machine-readable medium storing instructions, which, when executed by a processor, cause the processor to receive, by an optical tool, a first image of a first surface of one of a plurality of components on a wafer. The process then receive, by the optical tool, a second image of a second surface of the one of the plurality of components, the first and second surfaces in separate focal planes. The processor then compares the first image with a first reference image to produce a first value and the second image with a second reference image to produce a second value. The processor then generates a wafer map indicating a quality state of the one of the plurality of components based on the first and second values.

BRIEF DESCRIPTION OF THE DRAWINGS

For a detailed description of various examples, reference will now be made to the accompanying drawings in which.

DETAILED DESCRIPTION

Figure 1A:
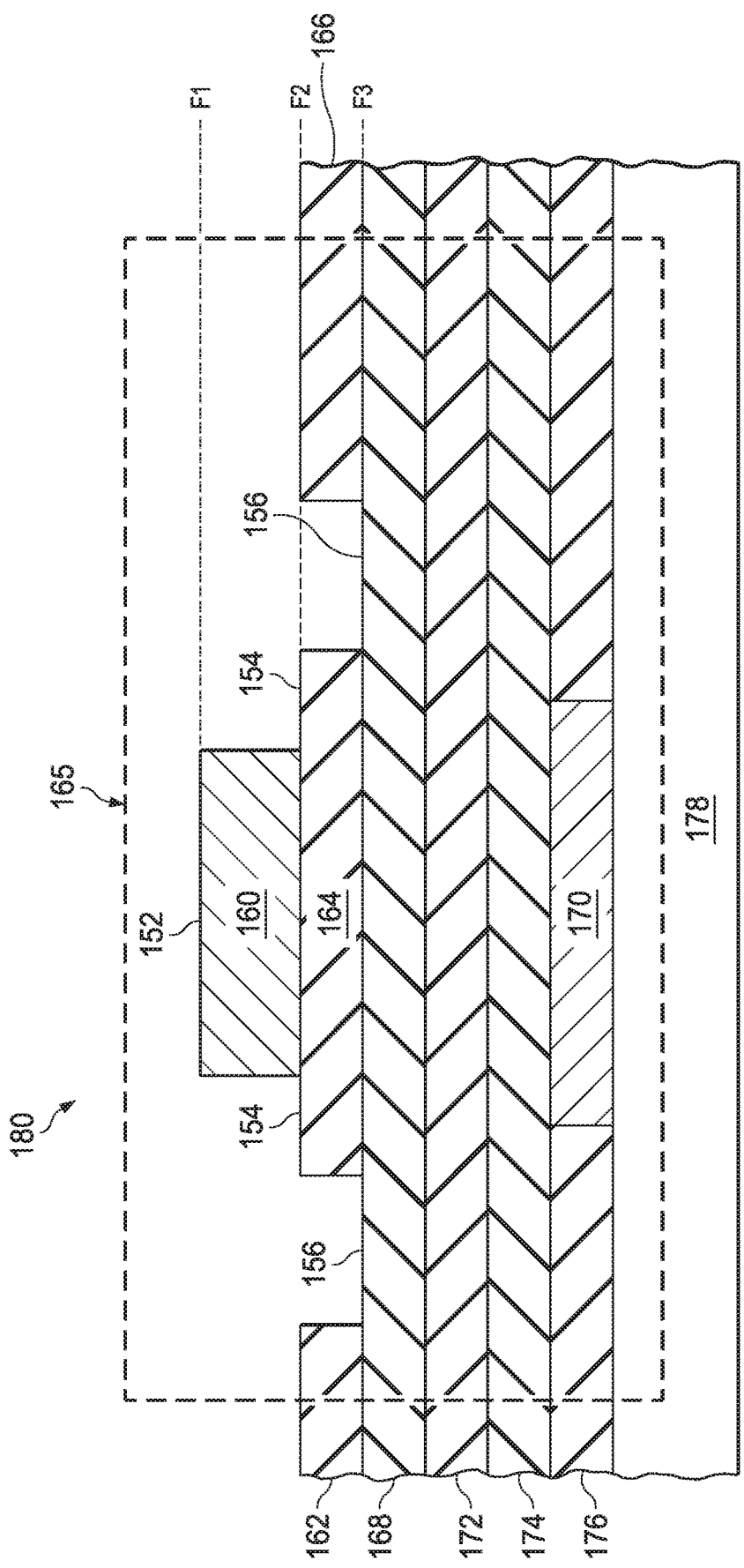
FIG. 1(a) is a cross section of a portion of an illustrative microelectronic device, in accordance with various examples.

As noted above, electrical and optical tests are performed to detect the defects in microelectronic devices. These tests are not always sufficient to detect all defects that may cause a microelectronic device to fail. In some cases, the electrical tests are performed by varying one or a set of device parameters (e.g., applied voltage). These electrical tests are typically performed to discard the devices that fail to meet some power or performance criteria. For example, a microelectronic device may function at certain high voltages (e.g., 8 kV), but not at or above the required testing voltage (e.g., 12 kV). These device failures are referred to as parametric failures. A microelectronic device may undergo parametric failure testing to detect defects that may lead to an excursion event (e.g., device failure). In some cases, following the discovery of an excursion event, the information gained from the excursion event is utilized to resolve the excursion source. Typically, this test is not economical and does not provide sufficient assurance of the quality of non-sampled microelectronic devices.

Optical tests may also be performed on the microelectronic devices to detect any defects generated during the fabrication process. Typically, the optical test is done on a single focal plane and is performed on a sample (or all) of the microelectronic devices present on a wafer. This test may be performed at multiple steps in the fabrication flow. In some cases, the tests may be performed before the devices are packaged and shipped to the customer. In other cases, the optical test is performed toward the end of the fabrication chain, e.g., after the passivation layer is deposited and the wafer is ready to be sawed. For instance, in the case of a high voltage (HV) (e.g., voltage greater or equal to 2 kV) microelectronic device, the optical test is performed just before the passivation layer is deposited on a high voltage plate. These tests substantially add to the overall cost of a microelectronic device and do not always provide sufficient assurance of the quality of the device.

Accordingly, at least some examples disclosed herein are directed to systems and methods for identifying defects that may be present in a microelectronic device. Specifically, the examples disclosed herein are directed to the identification of defects in microelectronic devices that contain a high voltage component such as a high voltage isolation capacitor. Extensive correlation tests revealed that the microelectronic devices containing high voltage components can fail due to defects that may be present in the high voltage components. Therefore, at least in some examples, optical inspections are performed on the high voltage components to identify and discard the defective microelectronic devices and to facilitate the packaging and shipping of the defect-free microelectronic devices. While the terms "microelectronic device" and "high voltage component" are functionally different, it can be appreciated that the high voltage component is present in the microelectronic device. If the high voltage component is defective, that, in turn, may render the microelectronic device defective.

The disclosed examples also facilitate culling out the defective microelectronic devices from the assembly chain, thus saving additional costs that may have been incurred in packaging of the defective microelectronic devices. In particular, the disclosed examples facilitate the removal of the defective microelectronic devices by performing optical inspection directly on the high voltage components of the microelectronic devices at multiple focal planes. Although this disclosure describes methods and apparatuses used to discard microelectronic devices containing high voltage components, such techniques may be readily adapted for any other type of microelectronic device. In some examples, microelectronic device may include an acoustic wave resonator that may further include multiple surfaces (e.g., stacked electrodes) at different focal planes. In such examples, multi-focal optical inspection may be used to remove the defective devices. In other examples, a microelectronic device may include dielectric stacks with sloped sidewalls. Such examples may also use multi-focal optical inspection may be used to discard the defective devices.

FIG. 1(a) is a cross section of a portion of an example microelectronic device 180 containing a component, such as a high voltage component 165 (e.g., a high voltage isolation capacitor). In the instant example, the microelectronic device 180 is an unfinished device. Additional fabrication processes, such as depositing a passivation layer, can be further performed on microelectronic device 180. High voltage component 165 is formed on a substrate 178 such as a silicon wafer. For instance, the high voltage component 165 can be employed in conjunction with a switch (e.g., JFET, MOSFET, GaN based switch, etc.; not expressly shown) formed in the substrate 178. The microelectronic device 180 further includes a high voltage isolation capacitor top plate 160 and bottom plate 170 as a part of the high voltage component 165. FIG. 1(a) further depicts a discontinuous dielectric layer formed using portions 162, 164, and 166. FIG. 1(a) also depicts additional dielectric layers 168, 172, 174, and 176 that may be present in the high voltage component 165.

Microelectronic devices containing high voltage components, such as that shown in the instant example, may fail due to defects that may be present in or around the high voltage component 165 (e.g., isolation capacitor). For instance, the defects that may occur on the surfaces 152, 154, and 156 may cause the microelectronic device 180 to fail. These defects typically originate in the fabrication process, either due to errors in the process or even as part of the baseline procedure. The surfaces 152, 154, and 156 are located on different horizontal planes such that each of the horizontal planes has a substantially horizontal surface that includes a vertical offset with respect to each other. In this example, the vertical offset can be greater than 3 um. In other examples, this vertical distance may vary.

Figure 1B:
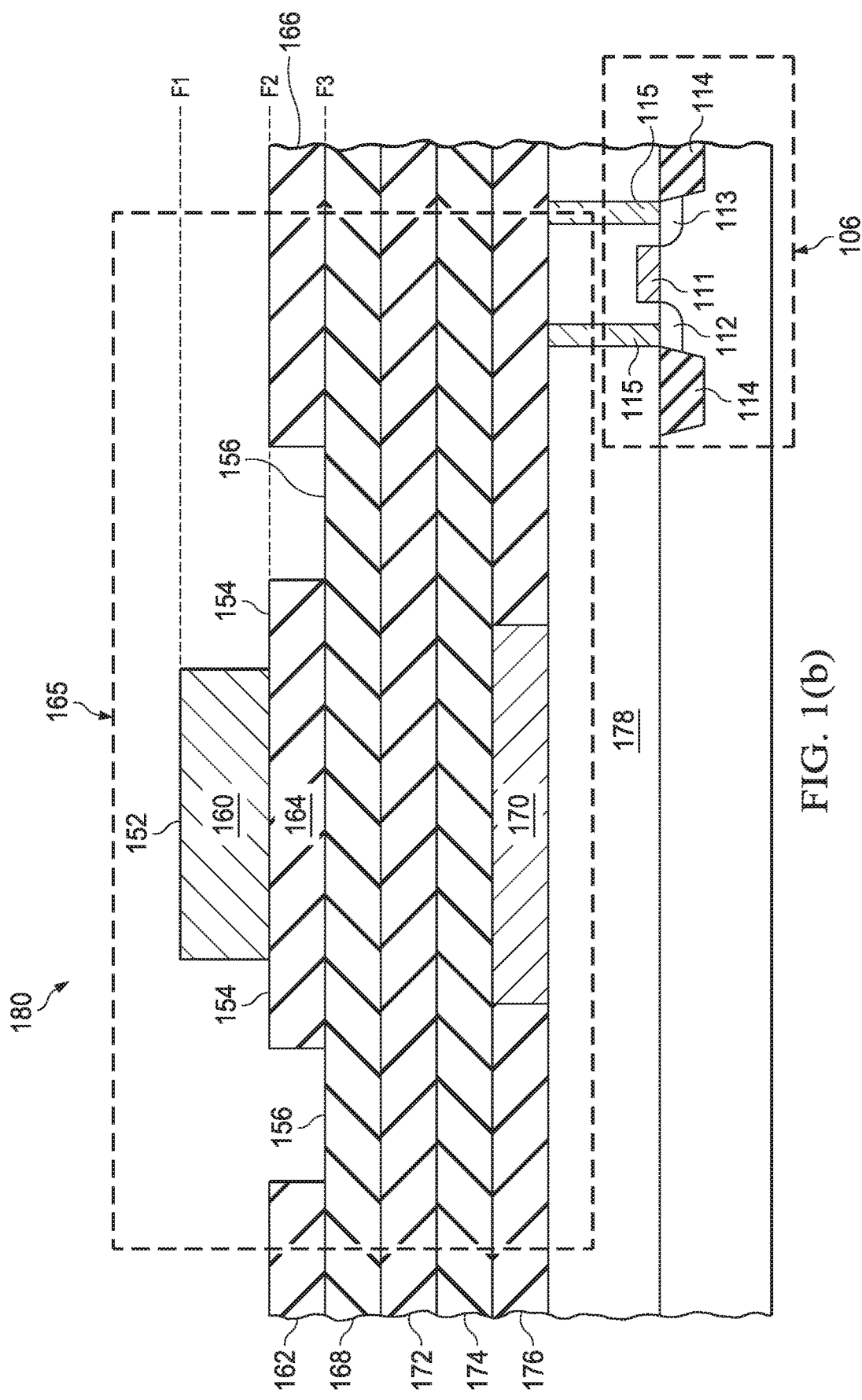
FIG. 1(b) is the cross section of the portion of the illustrative microelectronic device depicting a low voltage component, in accordance with various examples.

FIG. 1(b) is the cross section of the portion of the example microelectronic device 180 depicting a low voltage component 106. As noted above, the high voltage component 165 may be employed in conjunction with a switch formed in the substrate 178. FIG. 1(b) depicts such a gallium nitride (GaN) based switch that is formed in the substrate 178. In some examples, the low voltage component 106 may include additional layers on the top of the substrate 178. The additional layers may include an isolation layer (not expressly shown), gallium nitride layer (not expressly shown).

Figure 1C:
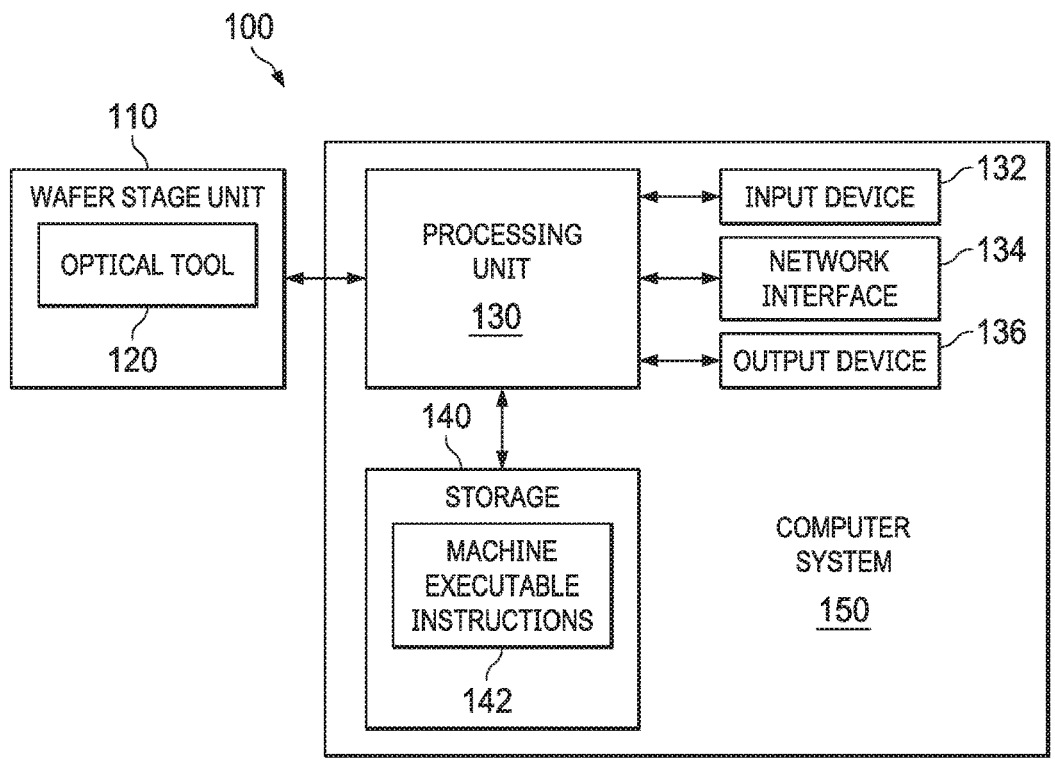
FIG. 1(c) is a block diagram of an illustrative multi-focal defect inspection system, in accordance with various examples.

FIG. 1(c) is now described in tandem with FIG. 1(a). FIG. 1(c) is a block diagram of an illustrative multi-focal defect inspection system 100 that is able to examine—at multiple focal planes—high voltage component 165 present in the microelectronic device 180. A microelectronic device, such as that shown in FIG. 1(a), is positioned on a wafer and typically a wafer includes multiple thousands of microelectronic devices. Accordingly, the multi-focal inspection system 100 includes a computer system 150 and a wafer stage unit 110 on which such a wafer may be positioned during testing. The wafer stage unit 110 may comprise an optical tool 120 (e.g., a scanning electron microscope or optical microscope), which is configured to generate multi-focal images of each of the high voltage components 165 present on the wafer placed on the wafer stage unit 110. For instance, the optical tool 120 can generate images of all of the high voltage components present on the wafer at different focal planes, e.g., the surfaces 152, 154, and 156. In some examples, imaging at different focal planes is desirable when the surfaces being imaged (e.g., 152, 154, 156) are vertically offset by more than 3 um, such as when the top capacitor plate is composed of a thick metal measuring, e.g., 3 um.

The computer system 150, in some embodiments, comprises a processing unit 130; storage (e.g., random access memory) 140 coupled to the processing unit 130 and storing machine executable instructions 142; an input device 132 coupled to the processing unit 130; a network interface 134 coupled to the processing unit 130; and an output device 136 coupled to the processing unit 130. The processing unit 130 may use the network interface 134 to communicate with one or more other computers. The processing unit 130 exchanges input and output data with the input device 132, the network interface 134, and the output device 136. In addition, the processing unit 130 executes the machine executable instructions, which cause the processing unit 130 to perform some or all of the actions attributed herein to the processing unit 130, the computer system 150, and/or the multi-focal inspection system 100. In some embodiments, the computer system 150 comprises a cognitive computing system with a neurosynaptic hardware architecture and machine-executable instructions 142 that facilitate machine learning and probabilistic algorithms. The computer system 150 may be a monolithic computer system (e.g., a single device), or it may comprise multiple, separate components, or it may comprise a distributed computer system that is located in multiple, separate locations. The computer system 150 may comprise multiple different sub-systems, including computer sub-systems and non-computer sub-systems (e.g., machinery to perform actions with tangible objects). The computer system 150 may perform its functions in a fully autonomous manner, or it may perform its functions in a semi-autonomous manner (e.g., with human assistance).

The processing unit 130 controls the wafer stage unit 110 and performs operations based on the machine executable instructions 142. Specifically, the processing unit 130 uses the images captured by the optical tool 120 and compares them to one or more reference images to generate a wafer map defining a quality state (e.g., acceptable, unacceptable, etc.) of each of the high voltage components (such as the high voltage component 165) present on the wafer. The quality state of each of the high voltage components determines if the microelectronic device will be packaged and shipped to the customer. For instance, if the quality state of the high voltage component 165 is "acceptable," the microelectronic device 180 will be further processed, packaged and sent to the customer. However, if the quality state of the high voltage component 165 is "unacceptable," the microelectronic device 180 can be culled away from the supply chain, thereby saving the costs associated with packaging and distributing poor quality products. The precise operation of the multi-focal defect inspection system 100 is now described with respect to FIGS. 2 and 3.

Figure 2A:
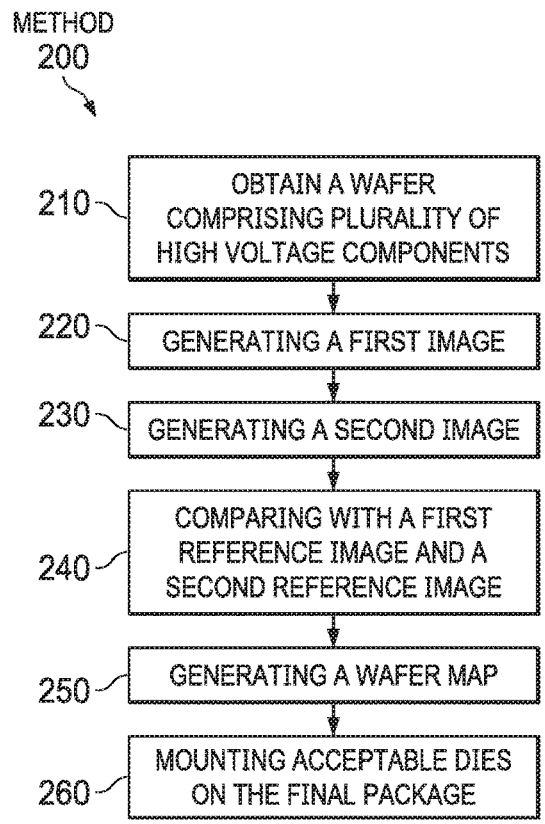
FIG. 2(a) is a flow diagram illustrating aspects of operations that may be performed by a multi-focal defect inspection system, in accordance with various examples.
Figure 2B:
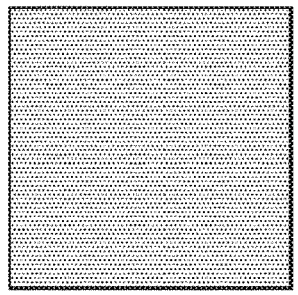
FIG. 2(b) depicts an illustrative reference image.
Figure 2C:
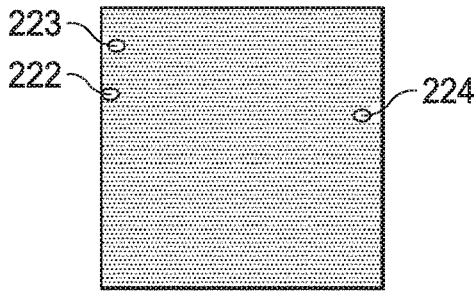
FIG. 2(c) depicts another illustrative reference image.

FIG. 2(*a*) is now discussed in conjunction with FIG. 1(*a*) and FIG. 1(*b*). FIG. 2(*a*) is a flow diagram of an illustrative method 200. The method 200 describes an illustrative operation performed by the multi-focal defect inspection system 100. Some of the steps of the method 200 may be performed by the optical tool 120. Other steps of the method 200 can be performed by the processing unit 130 as a result of executing the machine-executable instructions 142. The method 200 begins with obtaining a wafer comprising a plurality of high voltage components (step 210). Each of the high voltage components 165 is present in a microelectronic device 180 as shown in FIG. 1(*a*). As noted above, a single wafer may include multiple thousands of microelectronic devices. To perform the multi-focal defect analysis on a high voltage component 165, the surfaces 152, 154, and 156 of that high voltage component 165 should be visible to the optical tool 120. Therefore, the wafer obtained in the step 210 includes high voltage components 165 that expose the surfaces 152, 154, and 156 of all the microelectronic devices fabricated on the wafer.

The method 200 further includes generating a first image (step 220) of one of the high voltage components present in one of the microelectronic devices of the wafer obtained in step 210. The first image may be generated by the optical tool 120 (e.g., upon command by the processing unit 130 executing the machine executable instructions 142). The image generated by the optical tool 120 in the step 220 includes capturing an image at a single focal plane, such as F1, F2, or F3 (FIG. 1(*a*)). For instance, the optical tool 120 can generate an image of the surface 152 that is present in the focal plane F1. In some examples, the optical tool 120 can generate an image of the surface 154 present in the focal plane F2 or the surface 156 present in the focal plane F3. In some examples, the optical tool 120 may generate a first image (step 220) that may include multiple high voltage components (and, in turn, multiple microelectronics devices). For instance, in the case of capturing an image of multiple high voltage components, the image may show surfaces 152 of multiple high voltage components present in the wafer positioned in the focal plane F1. Similarly, in other examples, an image generated by the optical tool 120 may show surfaces (e.g., surface 154) of multiple high voltage components present on the focal plane F2. In some examples, each of the multiple microelectronic devices includes a coordinate assigned to it. Each microelectronic device may be represented using a coordinate system, such as, the Cartesian coordinate system. This coordinate system may be useful to uniquely identify a microelectronic device.

The method 200 further includes generating a second image (step 230). Similar to the step 220 described above, the optical tool 120, following commands issued by the processing unit 130 as a result of executing the machine executable instructions 142, generates a second image at a second focal plane of the same high voltage component 165 whose image at the first focal plane was captured in step 220, i.e., the first image generated in the step 220 and the second image generated in the step 230 are images of the same high voltage component captured at different focal planes. Stated another way, the images taken in the step 220 and the step 230 are images of two different surfaces, i.e., surface 152 in the step 220 and surface 154 in the step 230, of the same high voltage component. In some examples, the distance between the focal planes may depend on the vertical distance between the surfaces 152, 154, 156 which may be significant in high voltage components. In other examples, the focal planes may depend on the capability of the optical tool (120). In other examples, the focal planes may depend on the vertical distance between the positions where defects may be found.

Similar to the step 220, the second image generated by the optical tool 120 in the step 230 may capture multiple high voltage components present at the same focal plane. For instance, if the step 220 generates images of multiple high voltage components at the focal plane F1, the second image generated by the optical tool 120 in the step 230 may generate images of the same multiple high voltage components at the focal plane F2 (or F3) showing the surfaces 154 (or 156).

The method 200 may next include comparing each of the first and the second images taken in step 220 and step 230 with different reference images (step 240). In some examples, the reference images are stored in the storage 140. In some examples, reference images are images obtained from defect-free high voltage components. For example, a reference image for an image captured at the focal plane F2 of a potentially defective high voltage component may be an image captured at the same focal plane F2 of a high voltage component known to be defect-free. Refer now to FIG. 2(*b*), which depicts an illustrative defect-free image 241 that may be used to compare the potentially defective high voltage component. In some examples, the defect-free image 241 may be processed after being captured. In some examples, the processing may be done to enhance the visuality of the defects. In some examples, the reference images can be images of high voltage components that contain some defects, but that are less likely to fail a parametric failure test than the high voltage component under test. For instance, FIG. 2(*c*) further depicts another illustrative reference image 221 that may contain some defects (such as defects 222, 223, 224), but these defects may be less likely to cause a high voltage component to fail.

In some examples, the processing unit 130 may convert the first image into a pixelated image that includes one or more pixels. Each of these pixels may include a value. In such an example, the reference image is also digitized and pixelated (e.g., by the processing unit 130 or by another entity). The processing unit 130 may further perform a comparison between the pixelated first image and the pixelated reference image. In some examples, the comparison between the pixelated first image and the pixelated reference image is done by determining the difference between the values of one or more pixels. If the difference value is greater than a set threshold value, one of the high voltage components at the first focal plane may be flagged to be in an "unacceptable" state. On the contrary, if the difference value is less than a set threshold value, one of the high voltage components at the first focal plane may be flagged to be in an "acceptable" state. Using a similar principle, the second image is compared with the second reference image to generate the state of one of the high voltage components at the second focal plane.

In some examples, flagging a high voltage component includes flagging the coordinate of that high voltage component. In some examples, a single image—for example, one of the images captured in step 220 or 230—may serve as its own reference image. For instance, the step 220 can generate images of multiple high voltage components in the same focal plane, and the step 230 may do the same. Thus, one high voltage component can be used as a reference image for another high voltage component present in the same image. For example, the optical tool 120 may capture an image of two (or more) high voltage components (similar to the high voltage component 165). In such an example, the step 220 will generate a first image depicting the portions of high voltage components at the focal plane F1, and the step 230 will generate a second image depicting the portions of high voltage components at the focal plane F2. Further, in such an example, in step 240, the processing unit 130 upon executing the machine executable instructions 142 may compare one of the high voltage components present on an image with another high voltage component present on the same image. In some examples, the processing unit 130 may digitize the first image including two or more high voltage components. The digitized image is converted into a pixelated image that includes one or more pixels. Each of these pixels has a value. Each of the high voltage components present in the first image has a coordinate allocated to it. The first image includes a high voltage component whose pixelated image may be used as a reference image against another high voltage component. In some examples, the comparison between the pixels is done by determining the difference between the values of one or more pixels. If the difference value is greater than a set threshold value, one of the high voltage components that are being compared may be flagged to be in an "unacceptable" state. On the contrary, the difference value is less than a set threshold value, one of the high voltage components that is being compared may be flagged to be in an "acceptable" state. Using a similar principle, the second image is digitized, pixelated and compared to generate the state of one of the high voltage components at the second focal plane. In some examples, flagging a high voltage component includes flagging the coordinate of the high voltage component. In some examples, the high voltage components that are being compared may be positioned adjacent to each other, although the scope of this disclosure is not limited as such.

The method 200 next comprises generating a wafer map (step 250), which indicates a defect state of one or more of the plurality of high voltage components (and, in turn, the defect state of the microelectronic device on which the high voltage component is present). Based on the values generated in the step 240, the wafer map indicates the quality state of the high voltage components on the wafer. For instance, if all of the values generated in the comparison step 240 indicate that the quality states of the corresponding high voltage component are "acceptable," the wafer map indicates that the high voltage component is of an acceptable quality. Similarly, if any one of the values generated in the comparison step 240 indicates that a quality state of the high voltage component is "unacceptable," the wafer map reflects that the high voltage component is "unacceptable" (and, in turn that the microelectronic device is "unacceptable"). A different value is generated for a comparison made at each focal plane. Thus, in some examples, in order for the wafer map to reflect the quality state of the high voltage component to be "acceptable," all the values generated for each focal plane should be higher than a threshold value. In some examples, if any one of the values generated for each focal plane is lower than the threshold value, the wafer map may reflect the state of the high voltage component to be "unacceptable."

In some examples, the wafer map reflects (e.g., with multiple device bins representing different states) the quality state of all the high voltage components present on the wafer, and, in turn, reflects the quality state of all the microelectronic devices that are present on the wafer that was obtained in the step 210. If the wafer map reflects the quality state of a microelectronic device to be "acceptable," the device (and its post-singulation die) is further processed, packaged, and sent to the customer. In some examples, packaging a singulated die includes dicing the wafer into individual components and based on the wafer map, the acceptable dies are mounted on the final package, and the unacceptable dies are discarded (step 260). However, if the wafer map reflects the quality state of a microelectronic device to be "unacceptable," to reduce packaging costs, the device (and its post-singulation die) is culled from the supply chain and not packaged. For example, the defective die and microelectronic device may be discarded. In some examples, the packaging is done at a different location than the location at which the multi-focal inspection system 100 is placed. Therefore, the wafer map generated in the step 250 may be sent via the network interface 134 to a different location.

Figure 3:
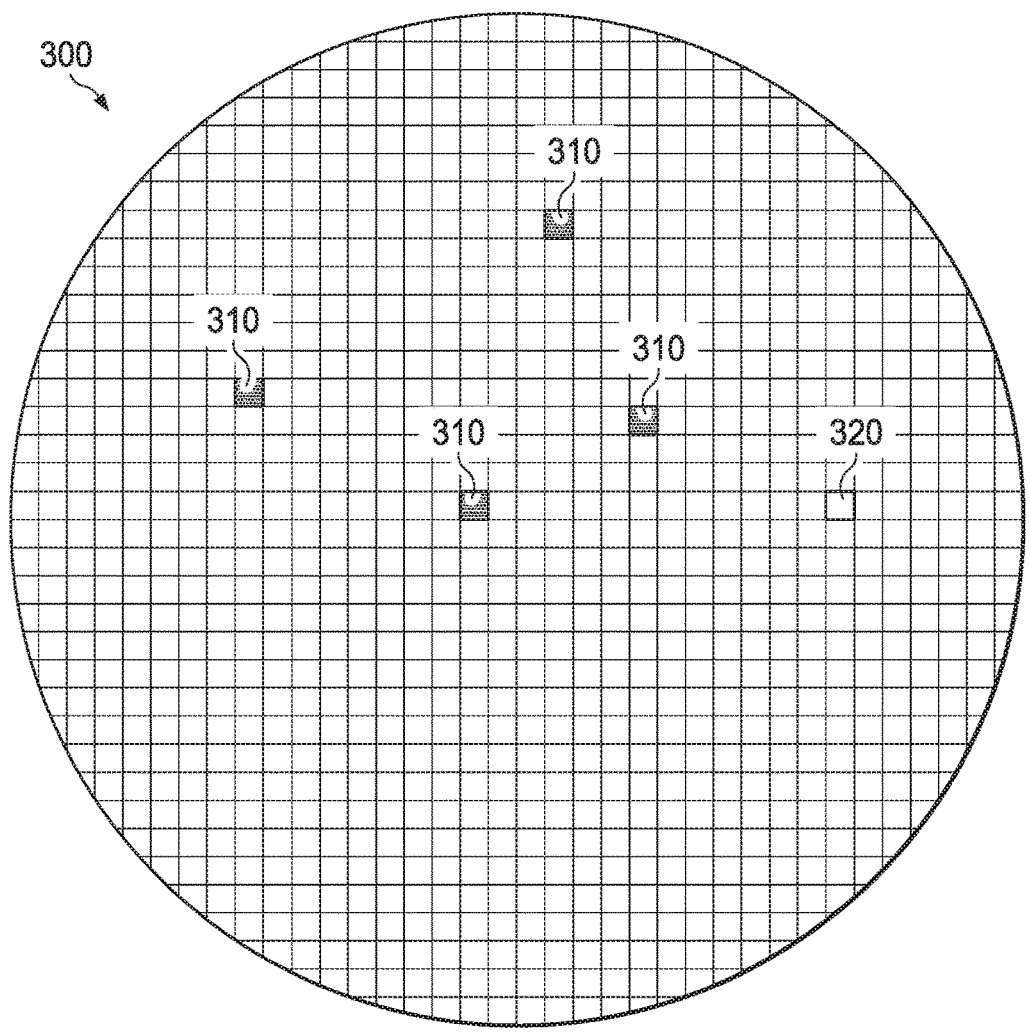
FIG. 3 is an illustrative wafer map indicating the quality states associated with multiple microelectronic devices of a wafer.

FIG. 3 depicts a wafer map 300 indicating the quality states of multiple microelectronic devices of a wafer, as discussed in the method 200 (step 250). The wafer map 300 may be a virtual map, which is generated by the processing unit 130 (FIG. 1). In some examples, the wafer map 300 shows multiple dies. For example, the wafer map 300 may be virtually divided using multiple parallel and perpendicular lines. Each rectilinear (e.g., rectangular) shape formed by the intersection of the parallel and perpendicular lines may form a die. As noted above, each of these multiple dies may include at least one microelectronic device, which contains a high voltage component.

The wafer map 300 further depicts the quality state of each of the high voltage components present on the wafer, which, in turn, reflects the quality state of the corresponding microelectronic device positioned on a die. The shaded (or color-coded with a color, such as red) dies 310 may indicate an unacceptable quality state of the corresponding microelectronic devices (or the dies). Similarly, the unshaded (or color-coded with a different color, such as green) dies 320 may indicate an acceptable quality state of the corresponding microelectronic devices (or dies). In some examples, each die can also be represented using a coordinate system, such as, the Cartesian coordinate system. For example, all of the dies depicted in FIG. 3 may be identified using X and Y coordinates. This coordinate system may be useful when the wafer map 300 is sent to a different location (e.g., assembly site), which may dice the wafer into multiple dies and discard the dies associated with an unacceptable quality state. The coordinate system may provide the location and the quality state of each of the die; therefore this information can be further utilized by a different team to further perform the necessary actions on each of the dies based on its quality state.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The invention claimed is:

1. A method comprising:
obtaining a wafer comprising a plurality of components, wherein each of the plurality of components exposes a first surface of the component present in a first focal plane and a second surface of the component present in a second focal plane;
generating, by a microscope, a first image of the first surface of one of the plurality of components;
generating, by the microscope, a second image of the second surface of the one of the plurality of components;
comparing, by a processor, the first image with a first reference image to produce a first value and the second image with a second reference image to produce a second value; and
generating, by the processor, a wafer map indicating a quality state of the plurality of components based on the first and second values.

2. The method of claim 1, wherein each of the plurality components comprises a third surface present on a third focal plane, further comprising:
generating, by the microscope, a third image of the third surface of the one of the plurality of components; and
comparing, by the processor, the third image with a third reference image to produce a third value.

3. The method of claim 2, further comprising determining the quality state using the third value.

4. The method of claim 2, further comprising determining the quality state to be acceptable in response to the first value, the second value, and the third value being higher than a threshold value.

5. The method of claim 4 further comprising packaging the one of the plurality of components in response to the quality state being deemed acceptable.

6. The method of claim 2, wherein the first reference image represents a surface present in the first focal plane and in another one of the plurality of components, the second reference image represents another surface in the second focal plane and in the another one of the plurality of components, and the third reference image represents a different surface in the third focal plane and in the another one of the plurality of components.

7. The method of claim 1, wherein the component is a high voltage isolation capacitor.

8. A method comprising:
obtaining a wafer comprising first and second components positioned consecutively on the wafer, the first component exposing multiple surfaces of the first component in separate focal planes, and the second component exposing other multiple surfaces of the second component in separate focal planes;
obtaining, by an optical or electron microscope, a first image depicting a first of the multiple surfaces of the first component and a first of the multiple surfaces of the second component, the first surface of the first component and the first surface of the second component in a common focal plane;
obtaining, by the optical or electron microscope, a second image depicting a second of the multiple surfaces of the first component and a second of the multiple surfaces of the second component, the second surface of the first component and the second surface of the second component in another common focal plane;
comparing, by a processor, the first surfaces in the first image to generate a first value;
comparing, by the processor, the second surfaces in the second image to generate a second value; and
generating, by the processor, a wafer map indicating a quality state of the first component, wherein the quality state depends on the first value and the second value.

9. The method of claim 8 further comprising:
obtaining, by the optical or electron microscope, a third image depicting a third of the multiple surfaces of the first component and a third of the multiple surfaces of the second component, the third surface of the first component and the third surface of the second component in a common focal plane; and
comparing, by the processor, the third surfaces of both the first component and the second component to generate a third value.

10. The method of claim 9, wherein the quality state depends on the third value.

11. The method of claim 9, further comprising discarding the first component if the quality state represents an unacceptable state.

12. The method of claim 9, wherein the quality state represents an acceptable state if and only if each of the first value, the second value, and the third value are higher than a threshold value.

13. The method of claim 12 further comprising mounting the first component into a package if the quality state represents the acceptable state.

14. The method of claim 8, wherein the second component is free of defects.

15. The method of claim 14, wherein the second component has fewer defects than the first component.

16. A non-transitory machine-readable medium storing instructions, which, when executed by a processor, cause the processor to:
receive, from an optical or electron microscope, a first image of a first surface of one of a plurality of components on a wafer;
receive, from the optical or electron microscope, a second image of a second surface of the one of the plurality of components, the first and second surfaces in separate focal planes;
compare the first image with a first reference image to produce a first value and the second image with a second reference image to produce a second value; and
generate a wafer map indicating a quality state of the one of the plurality of components based on the first and second values.

17. The non-transitory machine-readable medium of claim 16, wherein the quality state indicates an acceptable state if and only if each of the first value, the second value, and the third value is higher than a threshold value.

18. The non-transitory machine-readable medium of claim 16, wherein the first reference image represents a third surface of another one of the plurality of components, the third surface present in a same focal plane as the first surface, and wherein the second reference image represents a fourth surface of the another one of the plurality of components, the fourth surface present in a same focal plane as the second surface.

19. The non-transitory machine-readable medium of claim 18, wherein the one of the plurality of components and the another one of the plurality of components are consecutively arranged on the wafer.

20. The non-transitory machine-readable medium of claim 16, wherein the component is a high voltage isolation capacitor.

21. The method of claim 1, wherein the first surface is a surface of a first dielectric layer and the second surface is a surface of a second different dielectric layer.

22. The method of claim 8, wherein the first of the multiple surfaces is a surface of a first dielectric layer and the second of the multiple surfaces is a surface of a second different dielectric layer.

23. The non-transitory machine-readable medium of claim 16, wherein the first surface is a surface of a first dielectric layer and the second surface is a surface of a second different dielectric layer.

\* \* \* \* \*